(12) United States Patent
Huang et al.

(10) Patent No.: US 7,994,759 B2
(45) Date of Patent: Aug. 9, 2011

(54) SYSTEM AND METHOD FOR DRIVING A POWER SUPPLY DEVICE IN AN INITIAL ACTIVATION STAGE

(75) Inventors: Hsien-Ting Huang, Tainan (TW);
Yaw-Guang Chang, Tainan (TW)

(73) Assignee: Himax Technologies Limited (TW)

( * ) Notice: Subject to any disclaimer, the term of this patent is extended or adjusted under 35 U.S.C. 154(b) by 163 days.

(21) Appl. No.: 12/422,487

(22) Filed: Apr. 13, 2009

(65) Prior Publication Data
US 2010/0259232 A1    Oct. 14, 2010

(51) Int. Cl.
G05F 1/577 (2006.01)
G05F 1/00 (2006.01)
(52) U.S. Cl. .................. 323/267; 323/271; 323/272
(58) Field of Classification Search .............. 307/43; 323/265, 267, 271–281
See application file for complete search history.

(56) References Cited

U.S. PATENT DOCUMENTS

| | | | | |
|---|---|---|---|---|
| 4,309,574 A | * | 1/1982 | Sublette et al. | 379/375.01 |
| 5,307,005 A | * | 4/1994 | Ahladas et al. | 323/222 |
| 6,031,400 A | * | 2/2000 | DePuy | 327/103 |
| 6,838,862 B2 | * | 1/2005 | Luu | 323/274 |
| 7,221,027 B2 | | 5/2007 | Lin | |
| 2006/0239048 A1 | * | 10/2006 | Carter | 363/123 |
| 2007/0205604 A1 | * | 9/2007 | Heidebrink | 290/40 C |
| 2007/0262810 A1 | * | 11/2007 | Lee et al. | 327/534 |
| 2009/0251116 A1 | * | 10/2009 | Odell | 323/267 |

* cited by examiner

*Primary Examiner* — Adolf Berhane
*Assistant Examiner* — Jeffrey Gblende
(74) *Attorney, Agent, or Firm* — Baker & McKenzie LLP

(57) ABSTRACT

The present application describes a system and method for driving a power supply device in an initial activation stage. In one embodiment, the method comprises providing in the power supply device at least one voltage regulator that is coupled with a voltage output adapted to supply a power voltage to a client device, receiving a signal indicative of an activation of the power supply device, and converting the at least one voltage regulator to an equivalent shunting circuit coupled between the voltage output and a reference voltage. Before power voltages are applied at the outputs of the power supply device, shunting paths are thus provided for releasing undesired currents.

18 Claims, 4 Drawing Sheets

SYSTEM AND METHOD FOR DRIVING A POWER SUPPLY DEVICE IN AN INITIAL ACTIVATION STAGE

FIELD OF THE INVENTION

The present invention is related to a power supply device, and particularly to a system and method for driving a power supply device.

BACKGROUND OF THE INVENTION

When a power supply device is initially activated to supply power voltages to a client device (e.g., a driver integrated circuit (IC)), excessive transient currents and latch-up effects occurring at the output of the power supply device may be susceptible to cause damage and failure of the client device. An excessive transient current, which may be caused by electrostatic discharge or circuit inner residual charges, may result in an excessive amount of heat and burn the internal circuitry of the power supply device, jeopardizing the system reliability. In addition, the latch-up effect, usually triggered by the input of an overload transient current or voltage to the client device, may disrupt the proper operation and possibly leading to the destruction of circuit components in the client device.

To remedy the aforementioned problems, FIG. 1 illustrates a conventional approach for preventing excessive transient currents and latch-up effects when the power supply device is initially activated. For this purpose, a protection circuit is externally coupled with each voltage output of a power supply device 102 where a client device is to be connected (not shown). Each protection circuit typically includes an Schottky diode coupled between one output of the power supply device 102 and a reference voltage. For example, with respect to a negative voltage output $V_N$, a Schottky diode 104 is forward-connected from the output $V_N$ to a ground potential. For a positive voltage output $V_P$, a Schottky diode 106 is forward-connected from another reference voltage $V_{DD}$ to the positive voltage output $V_P$. While these external protection circuits provide effective shunting paths to release excessive transient currents, extra manufacturing costs are required.

Excessive transient currents and latch-up effects can also be prevented by providing a latch-up detection circuit, as disclosed in U.S. Pat. No. 7,221,027, the disclosure of which is incorporated herein by reference. However, the approach disclosed in this patent still requires a complex layout and additional semiconductor devices, which increases the manufacturing cost.

Therefore, there is a need for a system and method that can overcome the aforementioned issues in a more cost-effective manner.

SUMMARY OF THE INVENTION

The present application describes a system and method for driving a power supply device in an initial activation stage. In one embodiment, the method for driving the power supply device comprises providing in the power supply device at least one voltage regulator that is coupled with a voltage output adapted to supply a power voltage to a client device, receiving a signal indicative of an activation of the power supply device, and converting the at least one voltage regulator to an equivalent shunting circuit coupled between the voltage output and a reference voltage.

In one embodiment, a power supply device is also described. The power supply device comprises a first voltage regulator coupled with a first voltage output, and a second voltage regulator coupled with a second voltage output, wherein the first and second voltage outputs are adapted to supply different power voltages to a client device. In response to a signal indicative of an activation of the power supply device, the first voltage regulator is switchable to form an equivalent shunting circuit coupled between the first voltage output and a first reference voltage.

At least one advantage of the systems and methods described herein is the ability to conveniently convert voltage regulators provided in the power supply device into equivalent shunting circuits. As a result, before power voltages are applied at the outputs of the power supply device, shunting paths are provided for releasing undesired currents.

The foregoing is a summary and shall not be construed to limit the scope of the claims. The operations and structures disclosed herein may be implemented in a number of ways, and such changes and modifications may be made without departing from this invention and its broader aspects. Other aspects, inventive features, and advantages of the invention, as defined solely by the claims, are described in the non-limiting detailed description set forth below.

DETAILED DESCRIPTION OF THE EMBODIMENTS

Figure 1:
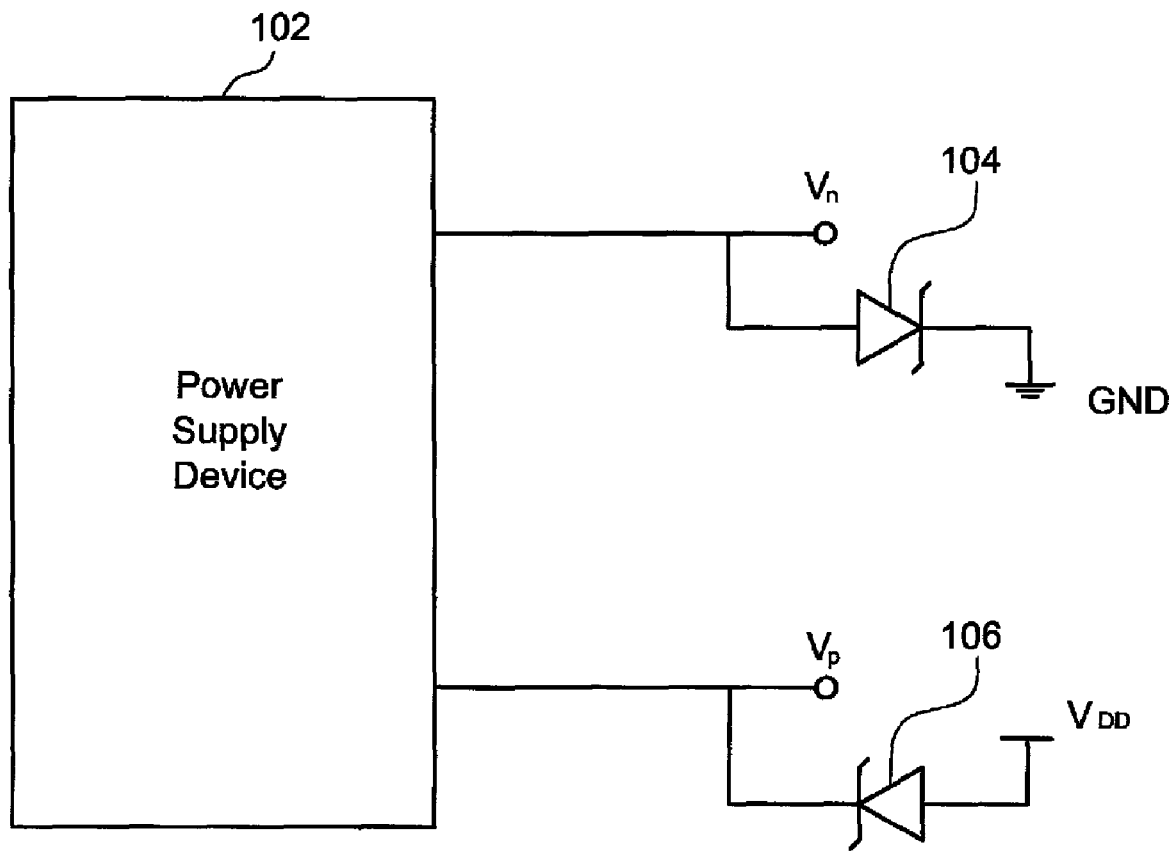
FIG. 1 is a block diagram illustrating a conventional power supply device.
Figure 2:
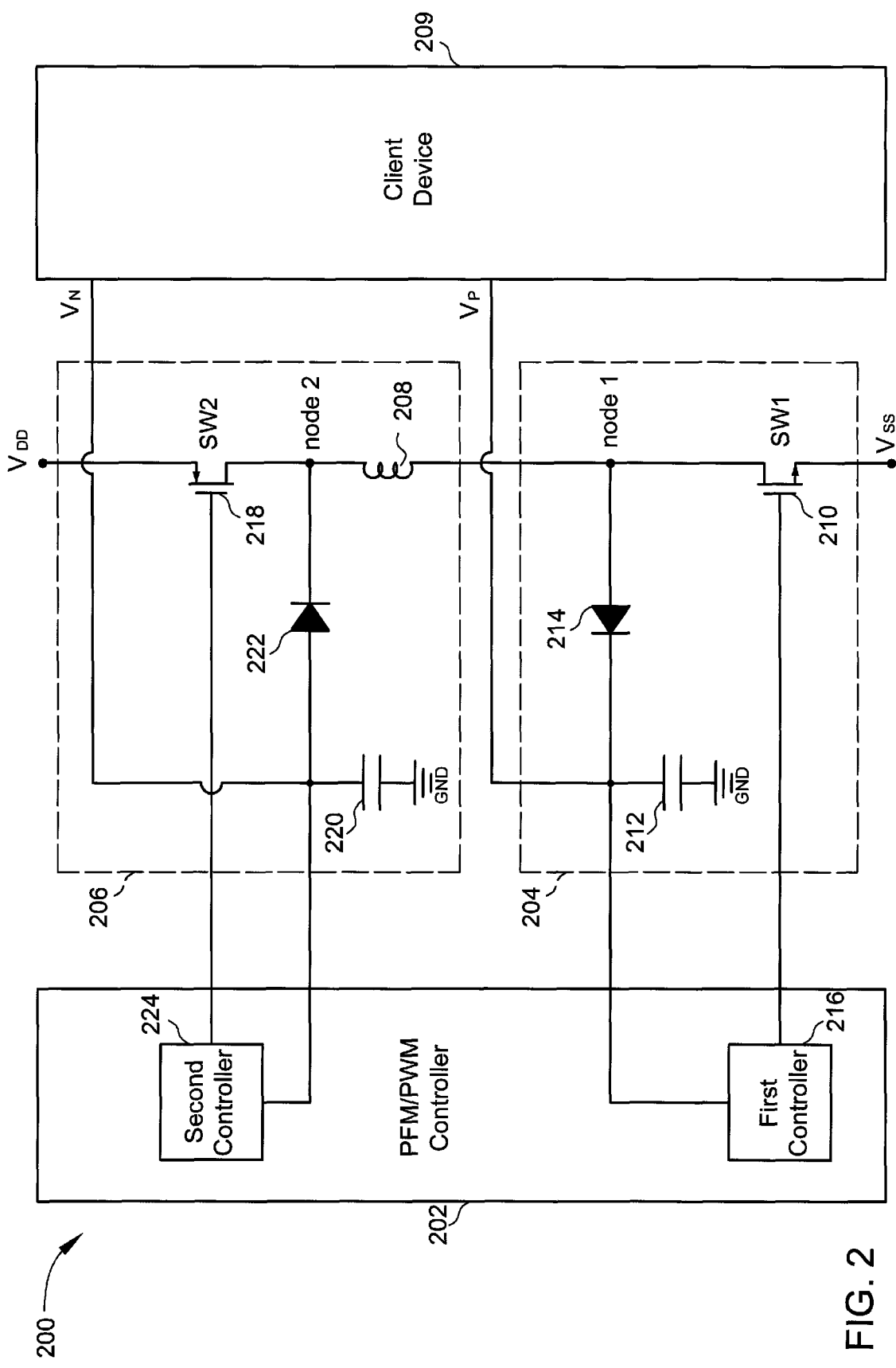
FIG. 2 is a block diagram illustrating a power supply device according to one embodiment of the present invention.

FIG. 2 is a schematic block diagram of a power supply device 200 according to an embodiment of the present invention. The power supply device 200 comprises a PFM/PWM (pulse frequency modulation and/or pulse width modulation) controller 202 coupled with a positive voltage output ($V_P$) and a negative voltage output ($V_N$), a first voltage regulator 204 coupled with the positive voltage output $V_P$, a second voltage regulator 206 coupled with the negative voltage output $V_N$, and an inductor 208 having a first node 1 coupled with the first voltage regulator 204 and a second node 2 coupled with the second voltage regulator 206. The first and second voltage regulators 204 and 206 are operable to supply desired constant voltages through the positive/negative voltage output $V_P/V_N$ to a client device 209. Examples of the client device 209 may include, without limitation, a driving integrated circuit (IC), a controller IC, or the like.

As shown in FIG. 2, the first voltage regulator 204 is connected between the node 1, the positive voltage output $V_P$ and a reference voltage $V_{SS}$. In one embodiment, the reference voltage $V_{SS}$ may be a negative voltage or ground potential. The first voltage regulator 204 includes a first switch element SW1 that is operable to selectively connect the first node 1 of the inductor 208 with the reference voltage $V_{SS}$. In one embodiment, the first switch SW1 can be an n-type MOSFET (metal-oxide-semiconductor field-effect transistor) 210. A first non-linear element, such as a Schottky diode 214, is forward-connected from the first node 1 to the positive voltage output $V_P$. The diode 214 turns on in forward-biasing and turns off in reverse-biasing, hence limiting the direction of the electric current that allows increasing of the positive voltage output $V_P$. A first capacitor 212 is coupled between a ground potential and the positive voltage output $V_P$ for maintaining the voltage level at the positive voltage output $V_P$. A first controller 216 is coupled between the positive voltage output $V_P$ and a gate electrode of the MOSFET 210. The first controller 216 is operable to switch the state of the MOSFET 210 by applying an adequate voltage to the gate electrode of the MOSFET 210. In one embodiment, the first controller 216 may be incorporated in the PFM/PWM controller 202.

Referring again to FIG. 2, the second voltage regulator 206 may have a circuitry very similar to the first voltage regulator 204 for regulating the negative voltage output $V_N$. The second voltage regulator 206, coupled between the second node 2 and the negative voltage output $V_N$, includes a second switch element SW2 operable to selectively connect the second node 2 of the inductor 208 with a reference voltage $V_{DD}$. In one embodiment, the reference voltage $V_{DD}$ is a positive voltage. Further, the second switch SW2 can be an p-type MOSFET 218. A second non-linear element, such as a Schottky diode 222, is forward-connected from the negative voltage output $V_N$ to the second node 2. The diode 222 turns on in forward-biasing and turns off in reverse-biasing, hence limiting a direction of the electric current that allows decreasing of the voltage level at the negative voltage output $V_N$. A second capacitor 220 is coupled between a ground potential and the negative voltage output $V_N$ for maintaining the voltage level at the negative voltage output $V_N$. A second controller 224 is also coupled between the negative voltage output $V_N$ and a gate electrode of the MOSFET 218. The second controller 224 is operable to switch the state of the MOSFET 218 by applying an adequate voltage to the gate electrode of the MOSFET 218. In one embodiment, the second controller 224 may also be integrated in the PFM/PWM controller 202. While two separate controllers have been illustrated in connection with the first and second voltage regulators 204 and 206, alternate embodiments may also integrate the two controllers 216 and 224 into a single controller for controlling the MOSFETs 210 and 218 as switch elements SW1 and SW2.

The inductor 208 coupled between the first and second voltage regulator 204 and 206 is adapted to store energy when both the first switch element 210 and the second switch element 218 turn on. By operation of the first switch element 210 and the second switch element 218, the stored energy can be released to modify the voltage level of either the positive voltage output $V_P$ or negative voltage output $V_N$.

Figure 3A:
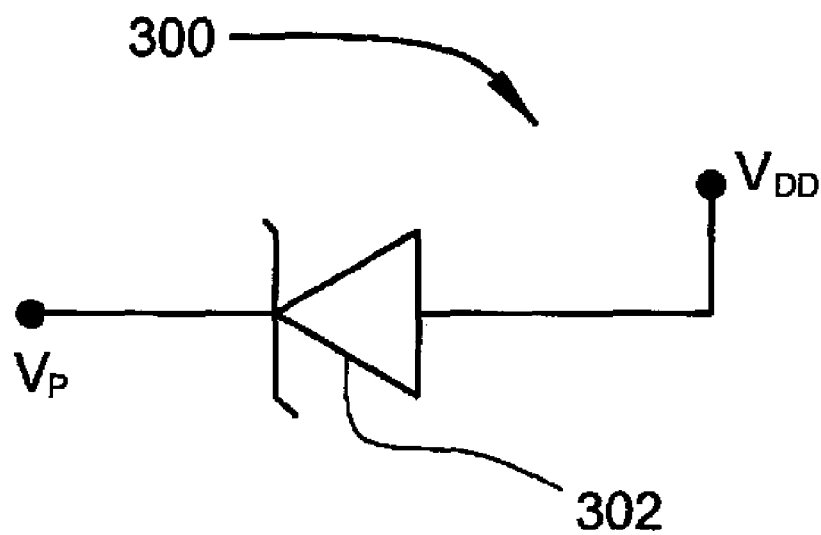
FIG. 3A is a diagram illustrating an equivalent shunting circuit formed by a first voltage regulator of the power supply device shown in FIG. 2, according to an embodiment of the present invention.

At initial activation of the power supply device 200, by suitably setting the first and second switch SW1 and SW2, each of the first and second voltage regulator 204 and 206 can be selectively converted into an equivalent shunting circuit coupled with either of the positive or negative voltage output $V_P$ and $V_N$. More specifically, when the first switch element SW1 is OFF (or non-conducting state) and the second switch element SW2 is ON (or conducting state), the first voltage regulator 204 can advantageously form an equivalent shunting circuit 300 including a shunting diode 302 forward-connected from the reference voltage $V_{DD}$ to the positive voltage output $V_P$ (FIG. 3A). This equivalent shunting circuit can be used for bypassing and releasing excessive currents that may occur at the positive voltage output $V_P$, and also prevent latch-up issues.

Figure 3B:
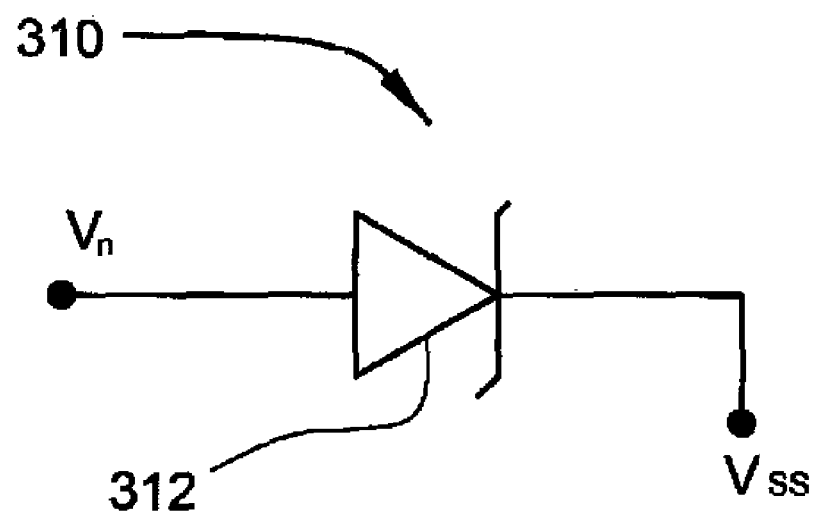
FIG. 3B is a diagram illustrating another equivalent shunting circuit formed by a second voltage regulator of the power supply device shown in FIG. 2, according to an embodiment of the present invention.
Figure 4:
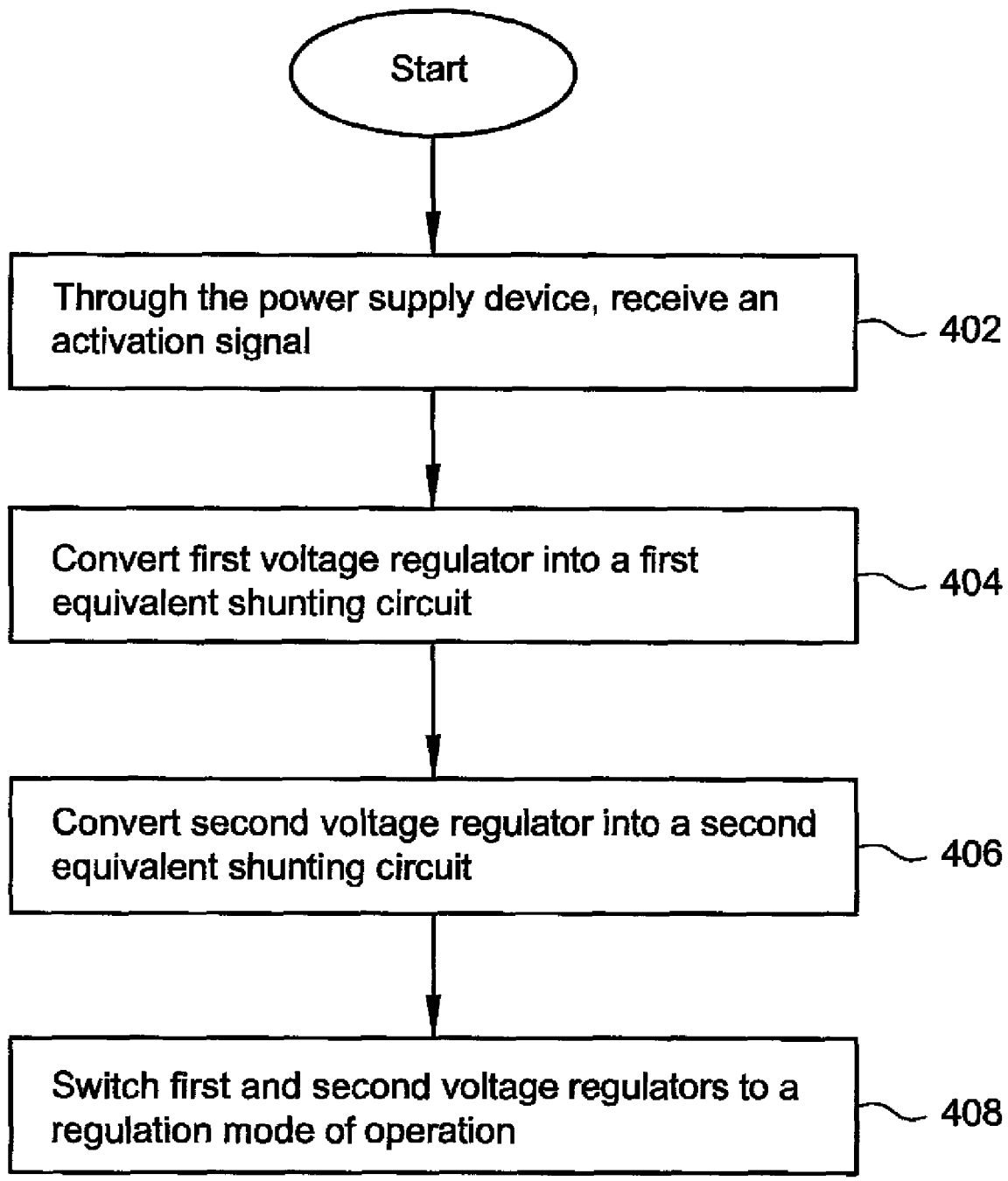
FIG. 4 is a flowchart of method steps applied when a power supply device is initially activated, according to an embodiment of the present invention.

Conversely, when the first switch element SW1 is ON and the second switch element SW2 is OFF, the second voltage regulator 206 is converted into a second equivalent shunting circuit 310 including a shunting diode 312 forward-connected from the negative voltage output $V_N$ to the reference voltage $V_{SS}$ (FIG. 3B). At initial activation of the power supply device 200, this second shunting circuit can likewise act for releasing excessive currents that may occur at the positive voltage output $V_P$. By adequately operating the MOSFETs 210 and 218 as switch elements SW1 and SW2, the first and second voltage regulators 204 and 206 can thus be converted into equivalent shunting circuits adapted to prevent the occurrence of excessive transient currents and latch-up effects.

In conjunction with FIGS. 2, 3A and 3B, FIG. 4 is a flowchart of method steps applied when the power supply device 200 is initially activated, according to an embodiment of the present invention. At initial step 402, the power supply device 200 receives an activation signal. Such activation signal may occur when the client device 209 wakes up or is activated. In response to the activation signal, step 404 is then performed, whereby the first voltage regulator 204 is converted into an equivalent shunting circuit by turning off the first switch element SW1 (i.e., non-conducting state) and turning on the second switch element SW2 (i.e., conducting state). In one embodiment, the OFF state of the first switch element SW1 and the ON state of the second switch element SW2 may be achieved by applying a same first gate voltage to the n-type MOSFET 210 and p-type MOSFET 218. This first gate voltage may be equal to about the reference voltage $V_{SS}$, for example. As a result, the first node 1 of the inductor 208 is disconnected from the reference voltage $V_{SS}$, whereas the second node 2 of the inductor 208 is connected with the reference voltage $V_{DD}$. As shown in FIG. 3A, the first voltage regulator 204 consequently forms a first equivalent shunting circuit 300 where the diode 214 acts as a shunting diode 302 forward-connected from the reference voltage $V_{DD}$ to the positive voltage output $V_P$. Before a power voltage is applied, a shunting path is thereby provided for bypassing and releasing undesired currents that may occur at the positive voltage output $V_P$.

In next step 406, the second voltage regulator 206 is converted into a second equivalent shunting circuit by turning on the first switch element SW1 and turning off the second switch element SW2. In one embodiment, the ON state of the first switch element SW1 and the OFF state of the second switch element SW2 may be achieved by applying a same second gate voltage to the n-type MOSFET 210 and p-type MOSFET 218. This second gate voltage may be equal to about the reference voltage $V_{DD}$, for example. As a result, the first node 1 of the inductor 208 is connected with the reference voltage $V_{SS}$, whereas the second node 2 of the inductor 208 is disconnected from the reference voltage $V_{DD}$. As shown in FIG. 3B, the second voltage regulator 206 consequently forms a second equivalent shunting circuit 310 in which the diode 222 acts as a shunting diode 312 forward-connected from the negative voltage output $V_N$ to the reference voltage $V_{SS}$. Before a power voltage is applied, a shunting path is thereby provided for bypassing and releasing undesired currents that may occur at the negative voltage output $V_N$.

In step 408, the first and second voltage regulator 204 and 206 may then be switched to a regulation mode of operation, where they act to regulate the power voltages applied by the PFM/PWM controller 202 at the positive and negative voltage output $V_P$ and $V_N$. In one embodiment, the regulation of the positive and negative voltage output $V_P$ and $V_N$ may be achieved by, for example, comparing each of the positive and negative voltage output $V_P$ and $V_N$ with predetermined reference values through the controllers 216 and 224, and accordingly control the conducting states of the n-type MOSFET 210 and p-type MOSFET 218.

It will be readily appreciated that while the illustrated embodiment has described a specific sequence where step 404 is performed before step 406, other embodiments may also perform step 404 and 406 in a different order, for example step 406 may be conducted before step 404.

As described above, the voltage regulators provided in the power supply device can be conveniently converted into equivalent shunting circuits at initial activation of the power supply device. The occurrence of excessive currents and latch-up events can thereby be prevented in a more cost-effective manner, without the need of extra diodes coupled external to the power supply device.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow

What is claimed is:

1. A method for driving a power supply device, comprising:
in the power supply device, providing a first voltage regulator that is coupled with a first voltage output adapted to supply a first power voltage to a client device, wherein the first voltage regulator comprises:
a first diode having a first electrode and a second electrode, the second electrode being connected with the first voltage output; and
a first switch coupled between the first electrode and a first reference voltage;
in the power supply device, providing a second voltage regulator that is coupled with a second voltage output adapted to supply a second power voltage to the client device, wherein the second voltage regulator comprises:
a second diode having a third electrode and a fourth electrode, the fourth electrode being coupled with the second voltage output;
a second switch coupled between the third electrode and a second reference voltage; and
an inductor having a first end terminal and a second end terminal, wherein the first end terminal is coupled with the first electrode of the first diode, and the second end terminal is coupled with the third electrode of the second diode;
receiving an activation signal indicative of an initial activation of the power supply device; and
in response to the activation signal, concurrently turning off the first switch and turning on the second switch, whereby forming an equivalent shunting circuit coupled between the first voltage output and the second reference voltage.

2. The method of claim 1, wherein the equivalent shunting circuit includes the first diode coupled between the first voltage output and the second reference voltage.

3. The method of claim 1, further comprising concurrently turning off the second switch and turning on the first switch in response to the activation signal, whereby forming a second equivalent shunting circuit coupled between the second voltage output and the first reference voltage.

4. The method of claim 3, wherein the step of concurrently turning off the second switch and turning on the first switch is performed after the step of concurrently turning off the first switch and turning on the second switch.

5. The method of claim 3, wherein the second equivalent shunting circuit includes the second diode coupled between the second voltage output and the first reference voltage.

6. The method of claim 1, wherein the first voltage regulator further includes a first capacitor connected between the second electrode of the first diode and a ground, and the second voltage regulator further includes a second capacitor connected between the fourth electrode and the ground.

7. The method of claim 1, wherein the first diode is forward-connected from the first end terminal of the inductor to the first voltage output, and the second diode is forward-connected from the second voltage output to the second end terminal of the inductor.

8. The method of claim 1, wherein the first voltage output is a positive voltage output, and the second voltage output is a negative voltage output.

9. The method of claim 1, wherein the first and second switches are switch transistors, and the first switch is turned off and the second switch turned on by applying a same gate voltage to the switch transistors.

10. A power supply device comprising:
a first voltage regulator coupled with a first voltage output, comprising:
a first diode having a first electrode and a second electrode, the second electrode being coupled with the first voltage output; and
a first switch coupled between the first electrode and a first reference voltage;
a second voltage regulator coupled with a second voltage output, comprising:
a second diode having a third electrode and a fourth electrode, the fourth electrode being coupled with the second voltage output; and
a second switch coupled between the third electrode and a second reference voltage; and
an inductor having a first end terminal and a second end terminal, wherein the first end terminal is coupled with the first electrode of the first diode, and the second end terminal is coupled with the third electrode of the second diode;
wherein the first and second voltage outputs are adapted to supply different power voltages to a client device; and
in response to an activation signal indicative of an initial activation of the power supply device, the first switch is operable to turn off and the second switch is operable to turns on concurrently to form an equivalent shunting circuit coupled between the first voltage output and the second reference voltage.

11. The power supply device of claim 10, wherein the equivalent shunting circuit includes the first diode coupled between the first voltage output and the second reference voltage.

12. The power supply device of claim 10, wherein the first and second switches are switch transistors, and the first switch is turned off and the second switch turned on by applying a same gate voltage to the switch transistors.

13. The power supply device of claim 10, wherein the first voltage regulator further includes a first capacitor connected between the second electrode of the first diode and a ground, and the second voltage regulator further includes a second capacitor connected between the fourth electrode and the ground.

14. The power supply device of claim 10, wherein in response to the activation signal, the first switch is further operable to turn on and the second switch to turn off concurrently to form a second equivalent shunting circuit coupled between the second voltage output and the first reference voltage.

15. The power supply device of claim 14, wherein the second equivalent shunting circuit includes the second diode coupled between the second voltage output and the first reference voltage.

16. The power supply device of claim 10, wherein the first diode is forward-connected from the first end terminal of the inductor to the first voltage output, and the second diode is forward-connected from the second voltage output to the second end terminal of the inductor.

17. The power supply device of claim 10, wherein the first voltage output is a positive voltage output, and the second voltage output is a negative voltage output.

18. The power supply device of claim 10, wherein the client device includes an driver integrated circuit (IC), or a controller IC.

* * * * *